May 1, 1956   J. R. FERGUSON   2,744,210
HEADLIGHT UNIT FOR MOTOR VEHICLES
Filed July 14, 1952   3 Sheets-Sheet 1
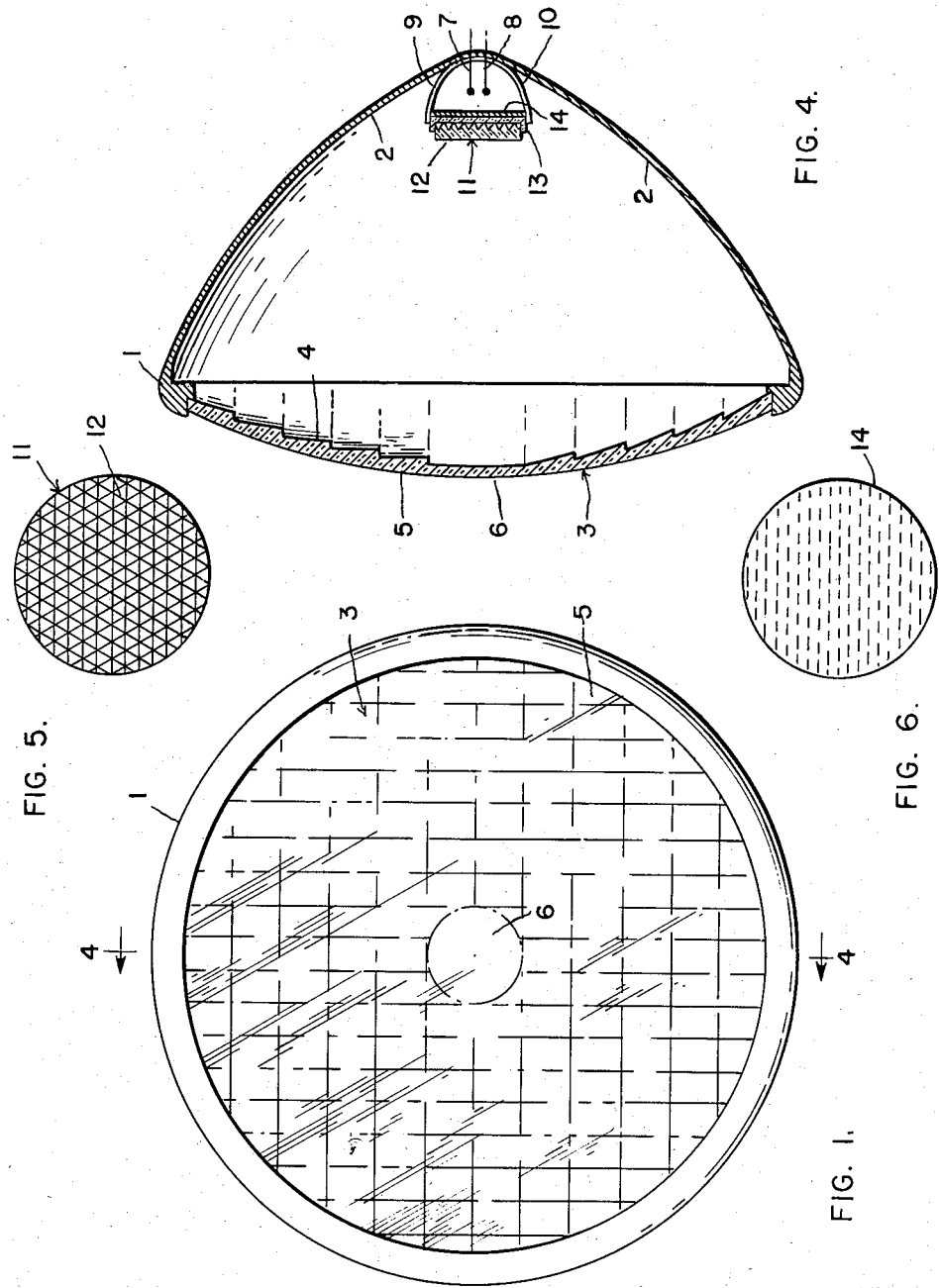
INVENTOR
JAMES R. FERGUSON
BY *Mason, Mason & Sheridan*
ATTORNEYS May 1, 1956  J. R. FERGUSON  2,744,210
HEADLIGHT UNIT FOR MOTOR VEHICLES
Filed July 14, 1952  3 Sheets-Sheet 2

INVENTOR
JAMES R. FERGUSON
ATTORNEYS

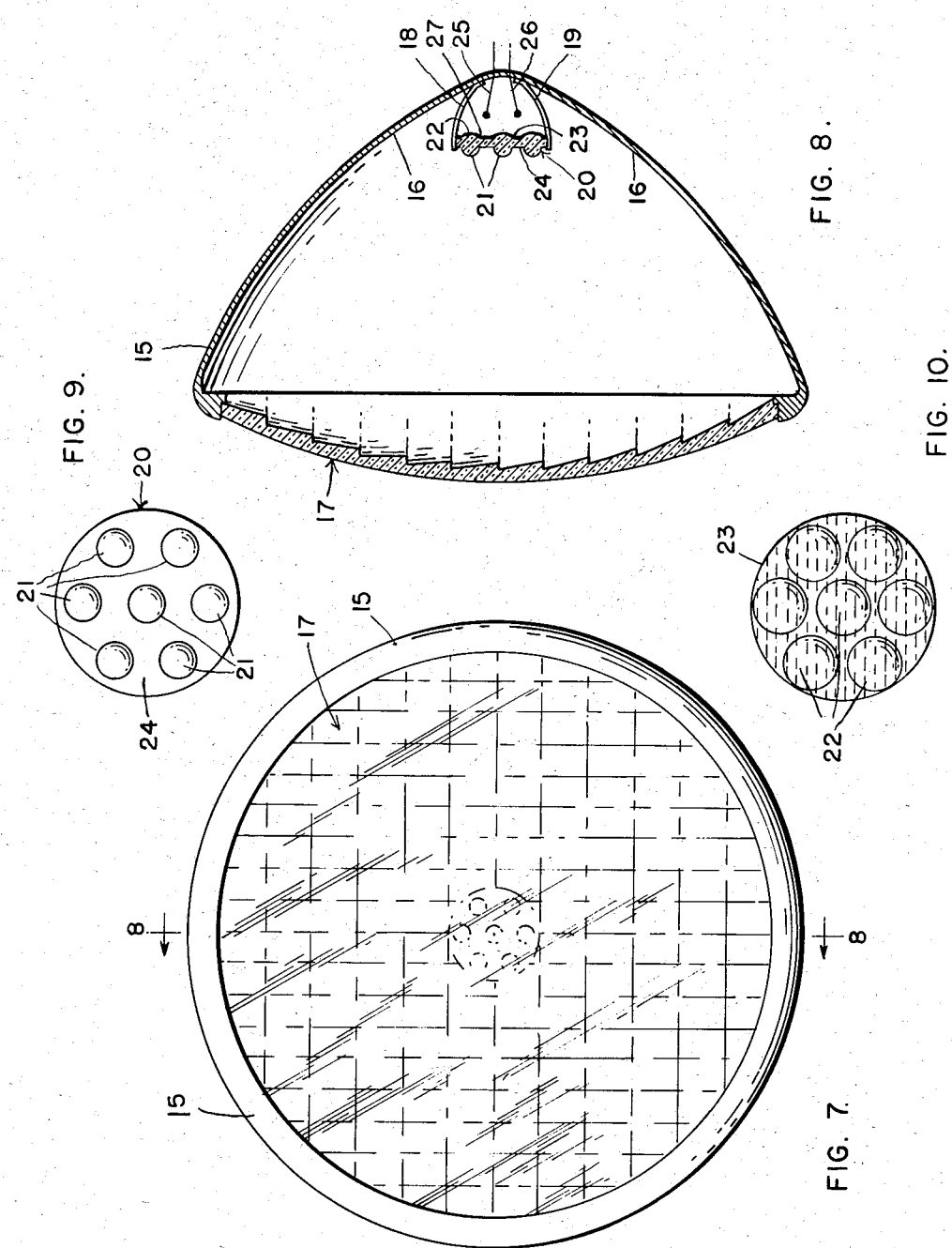

2,744,210
HEADLIGHT UNIT FOR MOTOR VEHICLES

James R. Ferguson, Bristol, Tenn., assignor of one-half to Bristol Steel & Iron Works, Inc., Bristol, Va.-Tenn., a corporation of Virginia Application July 14, 1952, Serial No. 298,705

3 Claims. (Cl. 313—111)

This invention is concerned with an automobile headlight unit of the type to be hereinafter described, which is adapted for passenger car, bus, truck and other automotive use.

An object of the invention is to provide a headlight unit of the sealed-beam type in which is combined a fog protector means and a reflector means comprising a single unit.

A further object is to provide a headlight unit having a combined reflector means and fog protector sealed within a sealed-beam type of headlight.

Other objects will appear hereinafter throughout the specification.

In the drawings:

Figure 1 is a front elevation of one form of lens of the headlight unit.

Figure 4 is a vertical section of the unit shown in Figure 1.

Figure 5 is a front elevation of the reflector means and fog protector.

Figure 6 is a rear elevation of the fog protector.

Figure 7 is a front elevation of another form of unit.

Figure 8 is a vertical section on the line 8—8 of Figure 7.

Figure 9 is a front elevation of the reflector means and fog protector; and

Figure 10 is a rear elevation of the structure shown in Figure 9.

There have been issued to Robert O. Ferguson Patents Numbers 2,512,623, issued June 27, 1950, and 2,565,763, issued August 28, 1951, for Headlight Units provided with reflector means mounted on the lens of the unit for reflecting light beams back to the driver of oncoming vehicles or vehicles which are facing in substantially the opposite direction as the vehicle having the reflecting lens unit.

The present invention relates to a headlight unit of the same general class as disclosed in the aforementioned patents however with the following distinctive features possessed by the present invention:

1. The instant invention provides a reflector means that is entirely unconnected with the lens of the unit.
2. The instant invention provides a fog protector and reflector assembly.
3. The instant invention has a fog protector and reflector assembly mounted within the envelope of the sealed-beam unit; and
4. The instant invention allows for a front lens which may be an entirely smooth unobstructed semi-hemispherical outer surface, although this surface as well as the lens inner surface may be otherwise shaped to suit the needs of the manufacturer, and the desires of the purchasing public. The above numbered structural features may be used singularly or combined within the scope of the present invention.

In Figures 1 to 4, there has been shown three types of lenses and one form of reflector means and fog protector, and in Figures 7 to 10 a fourth type, the same consisting of the conventional type of lens and a second type of reflector means and fog protector assembly, in order to reduce the number of figures. It will be understood however that any one of the lenses is usable with either reflector means and fog protector assembly.

In Figures 1 and 4 to 6, the numeral 1 represents the headlight envelope or casing as a whole, the said headlight being of the sealed-beam type wherein the interior of the casing is hermetically sealed against the entrance of dust and gases.

The inside back portion of the casing is shown at 2, and this consists of the conventional primary reflecting surface for reflecting beams of light in a forward direction.

Figure 2:
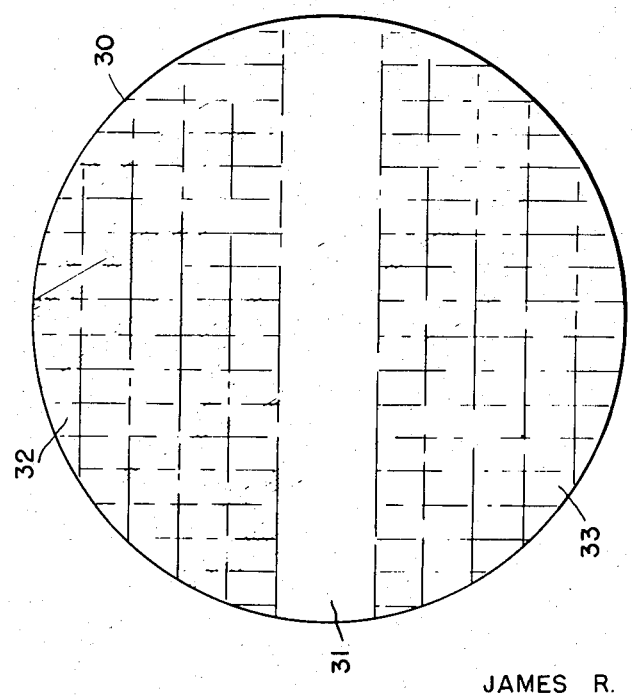
Figure 2 is a front elevation of another form of lens of the headlight unit.

The lens 3 may be of the conventional type having a fluted rear surface 4 having vertical and horizontal ridges, and a smooth front surface 5 as shown for instance in Figures 7 and 8, but I prefer to modify the rear surface of the lens by providing a clear bulls-eye portion 6, as shown in Figures 1 and 2, which portion may be flat, concave or convex. The opposite side preferably follows the hemispherical surface of the outside of the lens, or alternatively shaped to provide a single or a plurality of convex surfaces or buttons, not shown, within the area of the bulls-eye.

Extending through rear portion of the casing are a plurality of filaments 7 and 8 forming the light sources for high beam or low beam driving. In practice these light sources could either be exposed or located within a glass envelope or bulb, but as both of these constructions are conventional, and as either could be used without modifying the invention, both have not been illustrated, but for purposes of illustration only exposed light sources have been shown.

Supporting members 9 and 10, two being shown for illustrative purposes, are rigidly connected to the casing by suitable means and serve to support the secondary reflector means 11. In the form shown in Figures 2 and 3, this reflector means consists of a button of plastic material, i. e., composed of acrylic nitrile resin or other synthetic resin; although a glass button having a reflecting surface, or a reflecting metal disk or button is not excluded. Such plastic button is preferable however, and is provided with a prismatic or pyramidal forwardly facing reflecting surface 12.

I prefer to locate on the back or rear portion of the reflector means a heat insulating disk 13 of suitable material such as asbestos.

Mounted rearwardly of the reflector means and heat insulating disk is the fog protector 14, which consists of a disk of metal, whose rear face may or may not be a reflecting surface, according to requirements. The parts 11, 13 and 14 are supported as an assembled unit in proper position preferably directly in front of the light sources 7 and 8, by the supporting members 9 and 10. These parts may be made as a unit and united by welding or in any other suitable manner to the supporting members 9 and 10.

In the form shown in Figures 7 to 10, the envelope or casing is shown at 15, the primary reflecting surface forming the inside back portion of the casing at 16, and the lens at 17. The rear surface is entirely fluted, no bull's-eye being provided as in Figures 1 and 2. However, the structure of the secondary reflector and fog protector to be described in connection with these figures could be used with the lens shown in Figures 2 and 3, or a lens, both sides of which are plain, not shown, could be used, within the scope of the present invention, although I prefer either of the two types shown in Figures 1 and 2, or 5 and 6.

The secondary reflector and fog protector assembly consists in Figures 5 to 8 of supporting members 18 and 19 rigidly attached to the interior of the casing and to the disk 20, composed of glass and having a series of spaced forwardly facing convex buttons or protrusions 21, although a single convex surface, not shown, may take the place of the buttons.

Assuming the buttons are used, this structure being the preferred form of the invention over the single button assembly, the rear face of the disk 20 has a similarly axially placed number of protrusions 22.

The entire rear face of the disk 20 is preferably covered with a metal covering 23, the forward face 24 of which forms the secondary reflector.

It will be understood that the reflector 11, may be of metal, glass or plastic and that the insulator 13 or the disk 14 or both of them may be omitted.

The metal covering forms the fog protector because of its location immediately forward of the light sources 25 and 26 which may be similar to those shown in Figure 2.

The rear face 27 of the metal reflector may be of a reflecting or non-reflecting surface, according to the requirements of the headlight.

A rearwardly reflecting surface will increase the number of light rays reflected by the primary reflector 16.

In Figure 2 the lens 30 is provided with a clear or transparent portion 31 that extends entirely across the horizontal center portion of the lens, and two translucent or prismatic upper and lower portions 32 and 33 respectively. Clear portions of other designs of multi-sided configuration may be alternately used.

Figure 3:
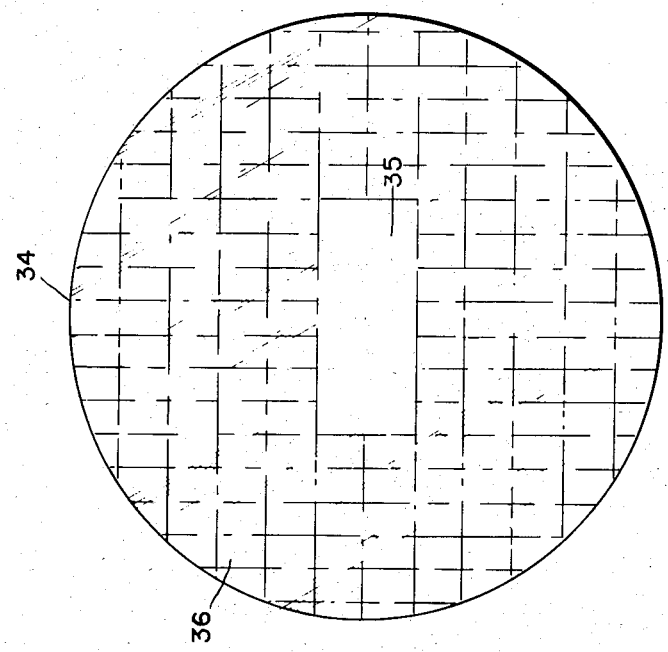
Figure 3 is a front elevation of a third form of lens of the headlight unit.

Figure 3 shows a lens 34 having a clear or transparent portion 35 and translucent or prismatic portion 36 that entirely surrounds the clear portion 35.

In order to facilitate an understanding of the invention, reference has been made to the several embodiments illustrated in the accompanying drawings, and specific language has been employed. It will nevertheless be understood that no limitation of the scope of the invention is thereby contemplated and that various alterations and modifications may be made such as would occur to one skilled in the art to which this invention relates. I desire to be limited in the practice of this invention only to the extent set forth in the appended claims.

I claim:

1. A headlight unit comprising a headlight casing having front and back walls and an inside forwardly facing primary reflecting surface on said back wall, a source of light located within said casing and carried by said back wall, said casing being hermetically sealed, a lens forming said front wall of said casing, a secondary forwardly facing reflector and fog protector means within said casing and spaced from said walls, said means being located between said source of light and said front wall and comprising a glass disk, supporting means for said disk including separate oppositely disposed members each rigidly secured at one end to said back wall and at its other end to the edge of said disk, each side of said disk having a centrally disposed button and a plurality of spaced buttons symmetrically arranged in a circle around said centrally disposed button, and a layer of reflecting material covering the back surface of said disk.

2. A headlight unit as defined in claim 1, wherein said buttons are convex in shape and said layer of reflecting material is made of metal.

3. A headlight unit as defined in claim 1, wherein each button on one side of said disk is in substantial alignment with a button on the opposite side of said disk.

References Cited in the file of this patent

UNITED STATES PATENTS

| | | |
|---|---|---|
| 1,323,963 | Caughrean | Dec. 2, 1919 |
| 1,594,635 | Skogland | Aug. 3, 1926 |
| 1,747,635 | Jackson | Feb. 18, 1930 |
| 1,880,892 | Dodge | Oct. 4, 1932 |
| 2,260,473 | Minchillo | Oct. 28, 1941 |
| 2,398,971 | Singer | Apr. 23, 1946 |
| 2,512,623 | Ferguson | June 27, 1950 |
| 2,565,763 | Ferguson | July 28, 1951 |